April 10, 1928.
G. RAMSEY
1,665,278
OPTICAL SPEEDOMETER
Filed Aug. 23, 1922
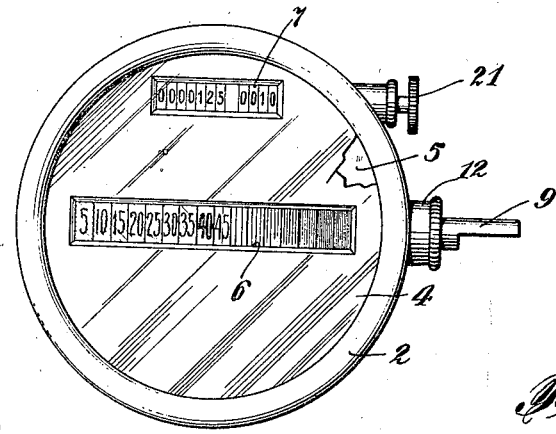
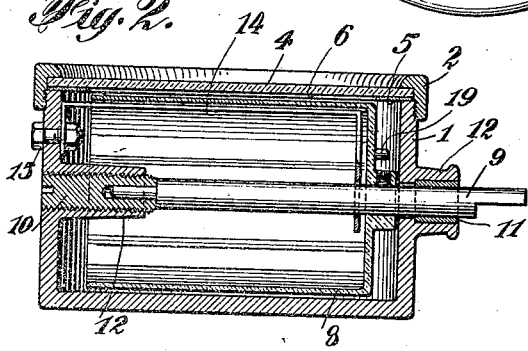
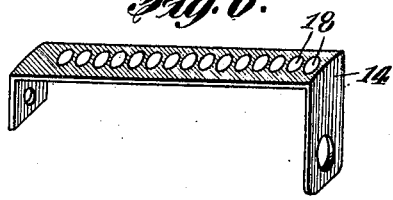
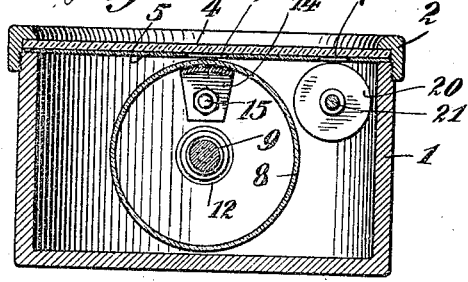
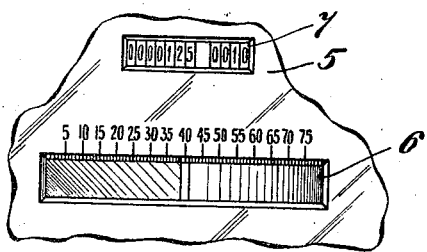
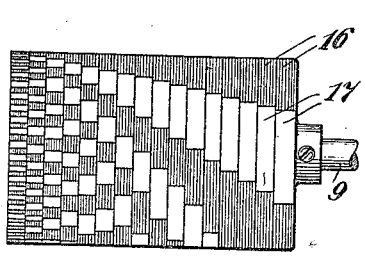
Inventor
George Ramsey Patented Apr. 10, 1928.

1,665,278

UNITED STATES PATENT OFFICE.

GEORGE RAMSEY, OF BROOKLYN, NEW YORK.

OPTICAL SPEEDOMETER.

Application filed August 23, 1922. Serial No. 583,764.

The present invention relates broadly to measuring instruments and more specially to a speedometer.

The principal object of the present invention is to indicate speed of rotation by causing one color to be blended into another and different color.

In my Patent 1,532,548 granted April 7, 1925, is disclosed and claimed a speedometer depending upon persistency of vision to cause blended colors to indicate speed, and in that disclosure all of the colors are arranged upon a rotating member.

The present invention is an improvement on my prior invention and provides a construction in which the color blend causes a change in color of a character or number indicating the speed for which the device is calibrated and at which speed the instrument is being operated; for example, where red and green complemental colors are used in the present invention and the speedometer is properly calibrated and driven at a speed corresponding, for example, to the forty-miles-per-hour calibration, the character "40" may be in color on a white background.

The present invention further contemplates a construction wherein colors are blended by providing one color, progressively arranged as to color, mass, or amount, on a moving member and another color on a stationary member which may be viewed through windows in the moving member. Under these conditions where an excessive speed over the persistency of the eye occurs the stationary color may appear to predominate whereas over that part wherein the speed is not up to persistency of vision the moving color may appear to predominate. For example, if the rotating member with the windows therein is colored green, and a stationary member of complemental red color is arranged beneath the moving member to be viewed through the windows of moving member which has been calibrated as to a scale, and is now driven at a speed corresponding to forty-miles-per-hour on the calibration, the zone adjacent the "40" on the said scale will turn white. All the portion of the scale below 40 will probably be of a redish tint whereas the portion of the scale above "40" will probably be of a greenish tint so that the critical speed may clearly stand out between the opposing tint colors.

In view of the above it may be stated that further objects of the invention are as follows:

Another and further object of the present invention is to provide an optical speedometer wherein critical speeds may be read directly on a suitable scale by visional color blends of the scale.

Another and further object of the present invention is an optical speedometer of the character specified in which a portion of the colors to be blended is carried on a rotating member provided with windows and another portion of the said colors is carried on a stationary member adapted to be viewed through said windows in the moving member.

A still further object of the present invention is an optical speedometer of the character specified in which one member carries a portion of the colors to be blended and another member carries the remaining portions to be blended with means arranged in such manner as to provide a relative movement between the members.

Other and further objects of the present invention will in part be obvious and will in part be pointed out hereinafter by reference to the accompanying drawings forming a part of this specification and throughout which like characters are used to represent like parts.

It is realized that the present invention may be embodied in constructions other than those herein specifically disclosed so therefore the disclosure herewith is to be understood as being illustrative and not in the limiting sense.

Figure 1 is a plan view of the face of the speedometer made in accordance with the present invention;

Figure 2 is a sectional view through a speedometer in accordance with Figure 1;

Figure 3 is a sectional view taken at right angles to the view shown in Figure 2;

Figure 4 is a view showing one form of rotating member constructed as a drum;

Figure 5 illustrates one type of scale bar with scale members directly on the bar;

Figure 6 is a perspective view of the scale bar showing indicators thereon other than members;

Figure 7 is a view of a detail portion of the face plate illustrating another embodiment of the present invention.

Referring now to the drawings, the present invention may be embodied in a construction comprising a casing 1 which carries a cover ring 2 which retains a cover glass 4 in position on the casing over a dial plate 5. The dial plate 5 is provided with suitable openings 6 and 7 through which readings may be taken. A drum 8 or the like, may be mounted upon a suitable shaft 9 in such manner that one end of the drum is open. This shaft 9 runs in suitable bearings 10, and 11 which may be provided in bosses 12 in the casing 1. A bar 14 extends into the drum from the open end thereof and is retained in position by a suitable anchor member 15. The drum 8 may be of non-transparent material and be provided with portions 16 that are colored a convenient color, for example, a tint of violet green, and the drum may be cut away as at 17 to provide open spaces or windows; or the drum may be formed of transparent material such as celluloid, glass, or other transparent material, with the color bands 16 arranged thereon and with the windows 17 being clear transparent spaces provided for sight passages. The color bands on the drum are arranged with progressively increasing lengths of spots of color. The progression is an arithmetical progression. The bar 14 may be conveniently arranged in such manner as to view through the opening 6 in the dial plate 5 in such manner that when the windows 17 pass beneath the opening the color of the bar may be observed through the windows, assuming the drum to be turned at very slow speed. Characters or numbers 18 may be arranged on the bar beneath the color bands and if the drum is colored violet-green then the bar may be colored a yellow-red. If the numbers or characters 18 on such a bar are white, then when the drum is rotated at such a speed as to cause alternate flashes of complemental colors on a particular band or zone to pass a point of vision at a rate greater than visional persistency the yellow-red on the bar and the violet-green on the drum will blend and will appear white. However, there is no complemental color to blend with the white number or character, consequently the number for the critical speed band will appear green on the white background, thereby selectively indicating the number indicating the critical speed of the drum.

It would appear that for the numbers below this critical speed number the persistency of vision of the color on the stationary bar would be greater than that of the color on the rotating member and consequently the background for such numbers would seem to appear as a blend in which red predominates. As to the numbers above the critical speed zone or band it would appear that the rotating color would predominate and that the background for such numbers would appear as a blend of green or muddy grey in which green predominates. It will therefore appear that the speedometer in accordance with the present invention may be constructed in accordance with the detail view shown in Figure 7 in which the "40 mile" zone appears as white, showing the instrument as indicating a speed of "40 miles-per-hour" whereas the lower speed zones will probably show as a blend of red, while the higher speed zones above the "40 miles" will probably show as a blend of green; the critical speed being the one distinct white zone.

In connection with the speedometer it is usually desirable to provide a measuring device or odometer. To this end, the drum 8 may be provided with an actuating pin 19 which drives the odometer wheels 20 which may be mounted upon a suitable reset shaft 21 as is common in the art.

From the foregoing it will appear that the present invention comprises more especially an optical speedometer in which a blend of colors indicates the critical speed and furthermore causes a change in color for this zone in such manner as to clearly select the portion of the scale corresponding to the speed being registered. In the above description, color blends have been referred to which produce white, however, it is to be understood that any desired tint of color may be used to produce any other distinctive color blend as well as white. It is also to be understood that the drive shaft 9 of the speedometer is adapted to be connected with suitable driving means, such as the road wheels or power plant of an automobile in the manner well known in the art, or with any other driving member such as a rotating body or shaft the speed of which is to be observed.

Having thus described my invention, what I claim is:

1. A speed indicator comprising a rotating member provided with alternate spots of color and windows, and a second member of different color adapted to be seen through said windows when the rotating member is rotated in such manner that a predetermined color blend is seen when said rotating member has reached a certain speed of rotation.

2. A speed indicator comprising a rotating member provided with alternate spots of color and windows arranged in bands with the length of the color spots being different for each band, and a second member of different color adapted to be seen through said windows when the rotating member is rotated in such manner that a predetermined color blend is seen when said rotating member has reached a certain speed of rotation.

3. A speed indicator comprising a rotating member provided with alternate spots of color and windows, and a stationary member of a complemental color adapted to be seen through said windows when the rotating member is rotated in such manner that a predetermined color blend is seen when said rotating member has reached a certain speed of rotation.

4. A speedometer comprising a rotating member provided with alternate spots of color and windows, a stationary member of different color adapted to be seen through said windows when the rotating member is rotated whereby a predetermined blend of the two colors is seen when the rotating member reaches a certain speed, and characters on the stationary member and also adapted to be seen through said windows.

5. A speedometer comprising a rotating member provided with alternate spots of color and windows arranged in bands with the length of the color spots being different for each band, and a stationary member of a complemental color adapted to be seen through said windows when the rotating member is rotated.

6. A speedometer comprising a rotating member of a uniform color and provided with bands of windows, said windows being arranged in such manner that for a constant rotating speed the number of windows in a band passing a visional point is in arithmetic progression to the number of windows passing in another band, and a second member of a different color adapted to be seen through said windows when the rotating member is rotated.

7. A speedometer comprising a rotating member of a uniform color and provided with bands of windows, said windows being arranged in such manner that for a constant rotating speed the number of windows in a band passing a visional point is in arithmetic progression to the number of windows passing in another band, a second member of a complemental color adapted to be seen through said windows when the rotating member is rotated, and characters of contrasting color value on said second member.

8. A speedometer comprising a drum of uniform color provided with windows of arithmetically progression lengths arranged in bands, with the windows in a single band all of uniform length and the colored portions between windows of a single band being substantially the same length as the windows of the same band, and a member of different color adapted to be viewed from said windows to provided blends of colors when the drum is rotated.

9. A speedometer comprising a drum of uniform color provided with windows of arithmetically progression lengths arranged in bands, with the windows in a single band all of uniform length and the colored portions between windows of a single band being substantially the same length as the windows of the same band, and a member of different color adapted to be viewed from said windows to provide blends of colors when the drum is rotated, a series of symbols on said member and adapted to assume a different color when the drum is rotated.

10. A speedometer comprising a drum of uniform color provided with windows of arithmetically progression lengths arranged in bands, and a shaft for said drum and a member of different color adapted to be viewed from said windows to provide blends of colors when the drum is rotated.

11. A speedometer comprising a rotating member of a violet-green color, said member being provided with windows of progressive lengths arranged in bands with the windows in each band being substantially the same length, whereby the windows and color portions alternate and an orange-red bar arranged relatively to said member to be viewed through the said windows when the member is rotated.

12. A device for indicating at least one speed comprising a rotating member of a violet-green color, said member being provided with at least one circumferentially aligned series of windows of equal circumferential dimensions, and an orange-red bar arranged relatively to said member to be viewed through the said windows when the member is rotated.

13. A speedometer comprising a rotating member of a violet-green color, said member being provided with windows of progressive lengths arranged in bands with the windows in each band being substantially the same length, an orange-red bar arranged relatively to said member to be viewed through the said windows when the member is rotated and characters in white on said orange-red bar.

14. A speedometer comprising a rotating member of a violet-green color, said member being provided with windows of progressive lengths arranged in bands with the windows in each band being substantially the same length, an orange-red bar arranged relatively to said member to be viewed through the said windows when the member is rotated and characters in white on said orange-red bar, there being one character for each band of windows.

15. A speedometer comprising a rotating member provided with windows of equal predetermined length in the direction of rotation of said member and spots of color of the same length as said window, and a second member of different color adapted to be seen through said windows when said rotating member is rotated.

GEORGE RAMSEY.